United States Patent
Gannon

[19]

[11] Patent Number: 6,017,439

[45] Date of Patent: *Jan. 25, 2000

[54] METHOD AND APPARATUS FOR SEPARATING LIQUID MIXTURES USING INTERMITTENT HEATING

[75] Inventor: Raymond Peter Gannon, Kippa-Ring, Australia

[73] Assignee: The University of Queensland, St. Lucia, Australia

[*] Notice: This patent is subject to a terminal disclaimer.

[21] Appl. No.: 09/066,923

[22] Filed: Apr. 27, 1998

Related U.S. Application Data

[63] Continuation of application No. PCT/AU96/00681, Oct. 31, 1996.

[30] Foreign Application Priority Data

Oct. 31, 1995 [AU] Australia .................................. PN6292

[51] Int. Cl.⁷ .................................................. B01D 61/26
[52] U.S. Cl. .......................... 205/703; 205/746; 205/763; 204/263; 204/265; 204/770; 210/321.67
[58] Field of Search ..................................... 205/703, 746, 205/763; 204/770, 263, 265; 210/321.67

[56] References Cited

U.S. PATENT DOCUMENTS

| | | | |
|---|---|---|---|
| 5,062,927 | 11/1991 | Stout | 203/89 |
| 5,089,122 | 2/1992 | Chmiel | 210/185 |

FOREIGN PATENT DOCUMENTS

| | | |
|---|---|---|
| 14557/83 | 11/1983 | Australia . |
| WO 96/02316 | 2/1996 | WIPO . |

*Primary Examiner*—Arun S. Phasge
*Attorney, Agent, or Firm*—Akin, Gump, Strauss, Hauer & Feld, L.L.P.

[57] ABSTRACT

A liquid mixture is efficiently separated using a separating membrane against which the liquid is sprayed, the membrane being intermittently heated to increase separation without subjecting the liquid mixture to high heat. The method is suited to flammable, toxic and temperature sensitive liquid mixtures.

14 Claims, 3 Drawing Sheets

METHOD AND APPARATUS FOR SEPARATING LIQUID MIXTURES USING INTERMITTENT HEATING

This application is a continuation of PCT/AU96/00681 filed Oct. 31, 1996.

FIELD OF THE INVENTION

This invention relates to a method and apparatus for separating liquid mixtures and particularly liquid-liquid mixtures using a membrane and where the membrane can be heated at specified intervals to facilitate the separation process.

The method and apparatus can be used to separate mixtures which may be temperature sensitive, flammable, toxic or otherwise unsuitable for separation using heat distillation. The method and apparatus is particularly suitable for separating undesirable liquid components from bio-fluids such as blood plasma.

BACKGROUND ART

A well known liquid-liquid separation technique involves distillation whereby liquids of different boiling points can be separated For liquids having close boiling points, separation efficiency is enhanced by using distillation columns. Distillation is unsuitable for many types of liquids including temperature-sensitive liquids (i.e., bio-fluids, certain liquid food products), highly flammable liquids, such as the low molecular weight ethers, liquids which have toxic vapours, or liquid-liquid mixtures where separation must be done quickly.

Membrane separation is used where separation of liquid mixtures by distillation is undesirable. Membrane separation is more commonly used to remove liquids from a liquid/dissolved solid mixture. The methodology behind membrane separation can be very complex and can include osmotic pressure, relative vapour pressures, diffusion co-efficients, molecular size, molecular shape and molecular charge.

A known type of liquid-liquid separation using membranes involves a combined permeation/evaporation method. A liquid-liquid mixture is passed into a first chamber which is separated from a second chamber by a membrane. A pressure differential is applied across the membrane and by correct choice of the membrane, a particular component in the liquid-liquid mixture will permeate across the membrane selectively in preference to other components. This type of membrane separation is described in European patent specification 034G739 and Japanese patent specification 1-159007. While this technique allows separation of temperature-sensitive components, a disadvantage with the technique is that it is relatively slow, making it less suitable for separation of mixtures which are unstable over time, or which must be treated quickly. For instance, slow membrane separation techniques are not suitable for purification of bio-fluids which must be removed from a patient's body, purified and re-introduced into the patient's body, as quickly as possible. The slow membrane separations are also unsuitable in many pharmaceutical, medical and beverage applications where it is desirable to achieve separation as quickly as possible.

Tests have shown that throughput across a membrane can be increased by heating the membrane. However, heating can cause deterioration of temperature sensitive liquids as mentioned above.

OBJECT OF THE INVENTION

The present invention provides a method and apparatus which can at least partially separate a liquid mixture in a manner which can overcome the abovementioned disadvantages, The method utilises a membrane to separate the liquid mixture and provides heating of the membrane at specific intervals to assist in the separation process. This method can produce superior results.

In one form the invention resides in a method for separating a liquid mixture comprising contacting the liquid mixture against one side of a separating membrane and heating the membrane at specific intervals.

The liquid mixture may be contacted against the one side of the separating membrane in the form of a spray The mixture may be atomized into a fine droplet spray by any suitable method or apparatus. A nozzle may be used to convert the liquid mixture into a spray of fine droplets. The spray may be generated within a gas flow and this may be achieved via a venturi type device. The gas may be an inert or reactive gas and may include compressed air, steam, nitrogen, carbon dioxide, sulphur dioxide, ethylene oxide, fluorine, hydrogen, argon, or mixtures thereof. The gas or gas mixture may be able to carry an electric charge.

The membrane may comprise a rigid or flexible membrane. A rigid perforated/porous ceramic or metal membrane may be used. An alternative form of membrane is a flexible polymer membrane. Known membranes may be used, these including semi-permeable flexible silicone rubber films which may be impregnated with zeolite materials. The zeolite materials can provide a range of pore sizes which can correspond which desired molecular sizes of liquid mixture components to be separated. The membrane may include a flexible nitrilebutadiene rubber, polyisobutylene rubber or styrenebutadine co-polymer rubbers The membrane may be hydrophobic. It is preferred that the membrane is an elastomeric polymer material impregnated with zeolites or other appropriate material of known absorption/permeability characteristics. It is also preferred that the membrane is able to carry an electric charge and this can be achieved either by choice of the membrane itself, choice of impregnated substances on or in the membrane, or by supporting the membrane on a support which can be charged.

The membrane may be of the type to facilitate the passage of components from the feed side to the discharge side but to resist backflow of the components. It is noted that heating of the membrane can encourage backflow of components from the discharge side of the membrane to the feed side To reduce the backflow, a membrane having a particular configuration may be used. This membrane may comprise a plurality of projections extending outwardly from the feed side of the membrane and arranged such that when the membrane adopts a concave configuration, adjacent projections move towards each other to reduce backflow of components across the membrane.

The projections may comprise an ordered array of round, oval, square or projections of other configurations. The projections may comprise a series of elongate ribs or alternatively may comprise separate teeth or button-like projections. If the membrane is doped or impregnated it is preferred that these added components are present in the projections but not in the remainder of the membrane. It is found that impregnating or doping membranes causes the membrane to exhibit a reduction in flexibility and durability with high fill ratios. By impregnating or doping the membrane in the above manner, the membrane can still have sufficient flexibility.

To assist in the separation process, the membrane and/or the liquid mixture may be subjected to an electric charge. The liquid spray may be charged by admixture with a gas which can be charged. The charge may be positive or negative. The membrane may comprise or include conductive components to allow it to accommodate a charge. Thus, the membrane may be impregnated with micro-porous compounds such as zeolite which have been sensitised with conductive components. Alternatively, or in addition to the above, the membrane may be associated with a support which may be subject to a charge.

To assist in the separation process, a pressure differential may be provided across the membrane. Suitably, the outlet side of the membrane is at a reduced pressure relative to the inlet side of the membrane.

For flexible or delicate membranes, a support may be provided. The support may comprise a mesh or grid. The support may extend adjacent the outlet side of the membrane. The support may be conductive and may be able to be charged either positively or negatively. The support may also be able to be heated.

In another form, the invention resides in an apparatus for at least partially separating a liquid mixture, the apparatus comprising a first inlet chamber, a second outlet chamber, a membrane separating the inlet and outlet chambers, and means to heat the membrane at specific intervals.

The inlet and outlet chambers may be subject to pressure variation and it is preferred that the outlet chamber is of reduced pressure relative to the inlet chamber.

The apparatus may include means to convert the liquid mixture into a spray and this may comprise a nozzle. A gas flow may be used to assist in converting a liquid mixture into a spray and this may be as described above.

The membrane and support may also be as described above.

The means to heat the membrane may comprise a heated or heatable element against which the membrane can abut at specified intervals. It is also possible that the element is attached to an arm or other arrangement such that it moves towards the membrane. It is preferred that the heatable element is stationary and the membrane is flexible and can be made to touch the element when desired. The element may comprise a mesh.

Suitably, the inlet chamber includes means to return liquid in the inlet chamber to a liquid reservoir or to the means to convert the liquid into a spray. The outlet chamber may be provided with a drain.

BRIEF DESCRIPTION OF THE DRAWINGS

An embodiment of the invention will be described with reference to the following figures in which.

BEST MODE

Figure 1:
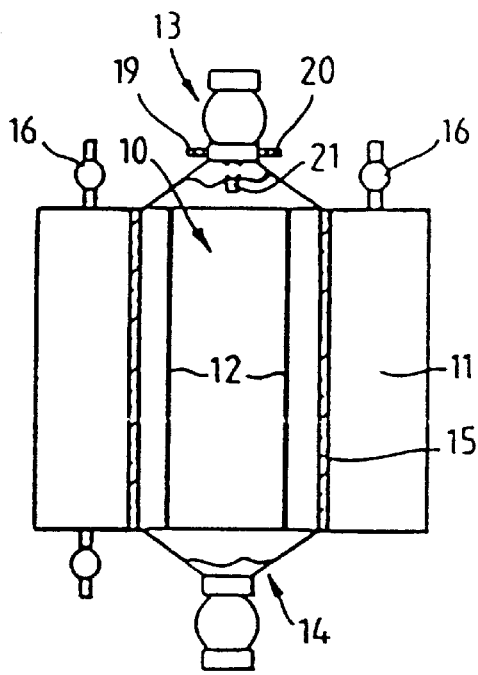
FIG. 1 illustrates a separating apparatus at the initial feed introduction.
Figure 2:
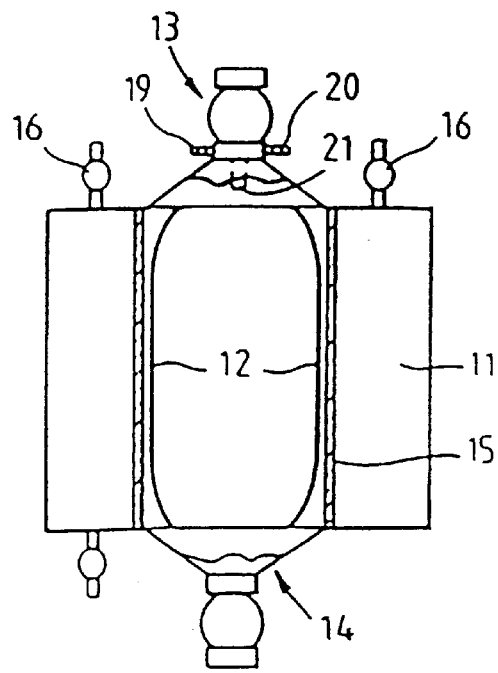
FIG. 2 shows the apparatus of FIG. 1 at optimum feed pressure and desorption contact.
Figure 3:
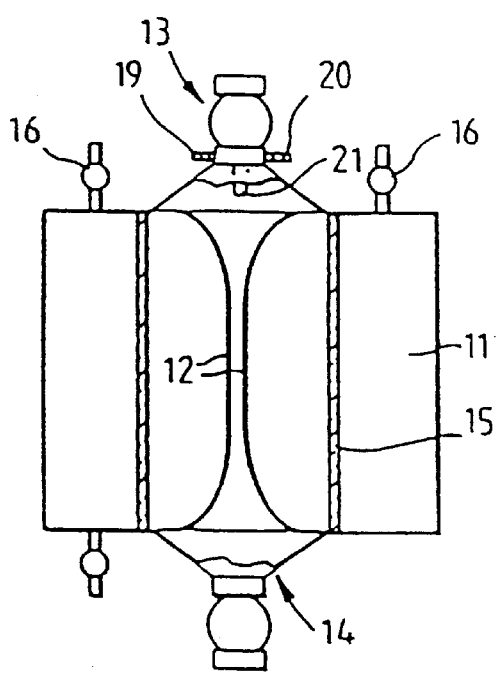
FIG. 3 shows the apparatus of FIG. 1 at maximum descaling position.

Referring to the figures and initially to FIGS. 1, 2 and 3 there is shown an apparatus for separating liquid components. The apparatus comprises a body formed into a cylindrical inlet chamber 10 and a cylindrical outlet chamber 11. The cylindrical inlet chamber 10 is partially defined by a membrane 12 which is cylindrical and therefore forms a side wall of cylindrical chamber 10. An upper end wall of cylindrical chamber 10 is associated with an atomiser assembly 13 while the lower wall is associated with a feed drain and recycle valve arrangement 14.

The outlet chamber 11 is fitted with an internal cylindrical mesh or screen 15 which is heated or heatable and which is spaced from and extends around the discharge side of membrane 12. Mesh 15 can be heated by applying an electric charge across the membrane in a conventional manner. The pressure between inlet chamber 10 and outlet chamber 11 can be varied by applying vacuum or positive pressure to either chambers and vacuum control valves 16 are provided on outlet chamber 11 which can be coupled to a vacuum pump (not shown).

An incoming liquid mixture which is to be separated initially passes into inlet 19 where it is mixed with a gas passing through inlet 20. The liquid and gas mixtures are passed into an atomising nozzle 21 the rate of which can be determined by a valve. Nozzle 21 atomises the liquid gas mixture and sprays it into chamber 10 As nozzle 21 introduces the spray into chamber 10, chamber 10 becomes pressurised relative to chamber 11 which results in an initial pressure differential being formed on each side of membrane 12. Any spray which condenses into larger droplets or a liquid can be recycled through feed drain 14 back to nozzle 21. Nozzle 21 is within a vacuum sleeve to allow recycled liquid to pass through a conduit and to re-emerge into chamber 10 as a spray.

Membrane 12 is of a flexible design and an embodiment a suitable membrane is shown in FIGS. 4 to 6.

Spaced from the discharge end of membrane 12 is the heatable mesh 15. The mesh size of mesh 15 is such that it itself does not perform any separation but functions as a possible support for membrane 12 and also as the heat source.

As inlet chamber 10 becomes positively pressurised due to the liquid/gas mixture being sprayed into the chamber, membrane 12 is caused to flex outwardly as illustrated in FIG. 2. The degree of outward flexing of membrane 12 can be controlled by the amount of spray passed into inlet chamber 10 and the pressure of outlet chamber 11. This can be controlled such that membrane 12 periodically contacts mesh 15. Thus, in an embodiment, the membrane can be caused to pulse and periodically contact mesh 15. Mesh 15 can be electrically (or otherwise) heated to between 50° C.–400° C. such that when membrane 12 contacts mesh 15, membrane 12 is briefly heated to facilitate passage of components across the membrane or to facilitate desorption of the membrane. The contact time of the membrane with heated mesh 15 can vary depending on the type of membrane used, and the temperature sensitivity or otherwise of the liquid mixture to be separated.

Mesh 15 can also be positively or negatively charged to also facilitate passage of components across the membrane In use, an atomised inward liquid enters inlet chamber 10 and membrane 12 is caused to bow outwardly. Periodically, membrane 12 can be caused to contact heated mesh 15 to desorb the membrane. The membrane is then caused to move away from mesh 15 until the mesh has been sufficiently cooled to no longer create undue heating. Alternatively, the mesh can stay in a heated state and membrane 12 is manipulated by pressure differentials to pulse against and contact heated mesh 15 at specified intervals. If mesh 15 is cooled, another variation is that membrane 12 is flexed to contact mesh 15, mesh 15 is then heated, membrane 12 is then caused to move away from mesh 15, mesh 15 is then allowed to cool after which membrane 12 can again contact mesh 15 in this variation, mesh 15 functions as a support as well as the heat source.

FIG. 3 illustrates a cleansing, descaling position where the pressure inlet chamber 10 is considerable less than that of outlet chamber 11 causing the membrane to flex inwardly which in turn can dislodge any build up of solid particulate matter on the membrane The removed particulate matter can be collected and discharged through feed drain and recycle valve 14.

Figure 6:
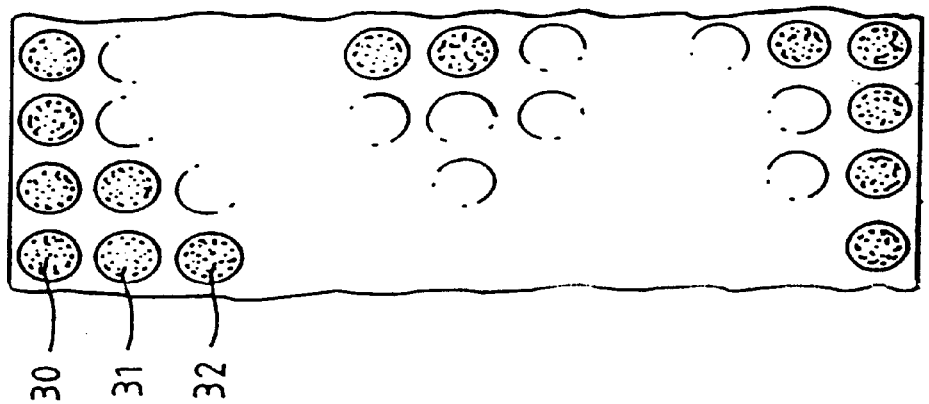
FIG. 6 is a plan view of the membrane of FIG. 4.
Figure 5:
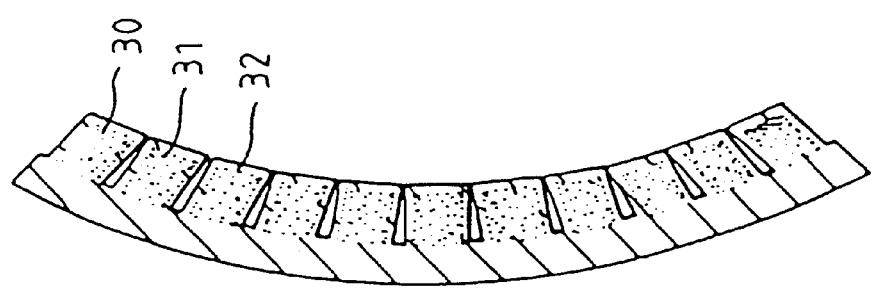
FIG. 5 is a side view of the membrane of FIG. 4 in a flexed position.
Figure 4:
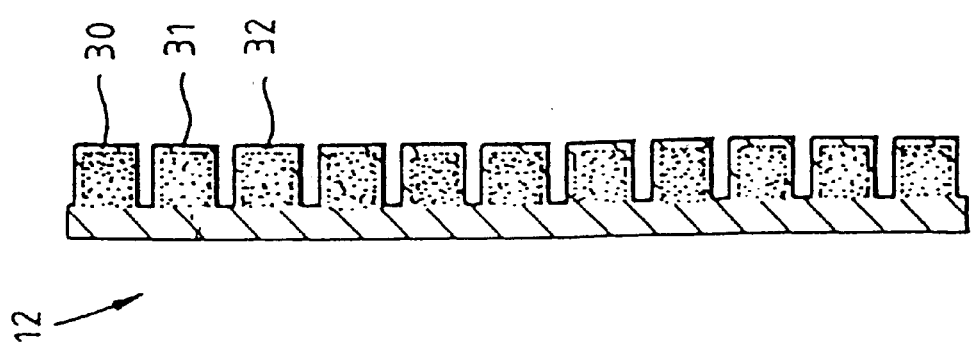
FIG. 4 is a side view of a membrane.

FIGS. 4 to 6 illustrate a preferred membrane. Membrane 12 is formed with a plurality of projections 30, 31, 32 which are button-like or tooth-like in configuration and which extend from the feed side of membrane 12. The projections are regularly spaced along and across the feed side of membrane 12 as shown in FIG. 6. The projections are impregnated or doped with desired components such as zeolites, while the portions between the projections are not doped or impregnated. The particular membrane allows normal transport through the membrane while in a flat configuration. When the membrane is flexed by differential pressure into a concave configuration as shown in FIG. 5, the projections on the feed side of the membrane are forced together into a close fitting formation which restricts backflow of components through the membrane. By having the doped or impregnated areas not uniformly through the membrane, the membrane still has sufficient flex and durability to withstand the pulsing action of the separation process. The slight loss of impregnated or doped surface area can be counter-balanced by the higher surface area created by the projections and recesses between the projections.

While the above method and apparatus is useful for temperature sensitive liquid separations or separations where elevated temperatures are undesirable, there are certain liquid mixtures which are not temperature sensitive and therefore do not require the same degree of care with exposure of the liquid mixture to heat. For instance, many liquid dissolved solid mixtures or liquid suspended solid mixtures are not temperature sensitive and separating techniques such as desalination or water distillation using elevated temperatures can be used. Thus, in another form the invention comprises a method for Separating a liquid mixture comprising contacting the liquid mixture against one side of a separating membrane in the form of a spray, the membrane being heated to at least partially vaporise a liquid component of the mixture.

This method is suitable for desalination and water distillation. The liquid mixture may be atomised into a fine droplet spray by the method or apparatus described above Similarly, the membrane may be as described above or alternatively may include a rigid, porous, sintered glass plate. The membrane may be heated by a heating means which may be impregnated into or part of the membrane.

An apparatus according to this invention may comprise a first inlet chamber and a second outlet chamber, a membrane separating the inlet and outlet chambers, means to convert the liquid mixture into a spray before contact with the membrane, and heating means to heat the membrane.

The inlet and outlet chambers may be subject to pressure variations and it is preferred that the outlet chambers of reduced pressure relative to the inlet chamber.

The means to convert the liquid mixture into a spray may comprise a nozzle. A gas flow may be used to assist in converting the liquid mixture into a spray and this may be as described above.

The membrane may also be as described above.

Cooling means may be provided in the outlet chamber to condense vapours passing through the heated membrane.

Figure 7:
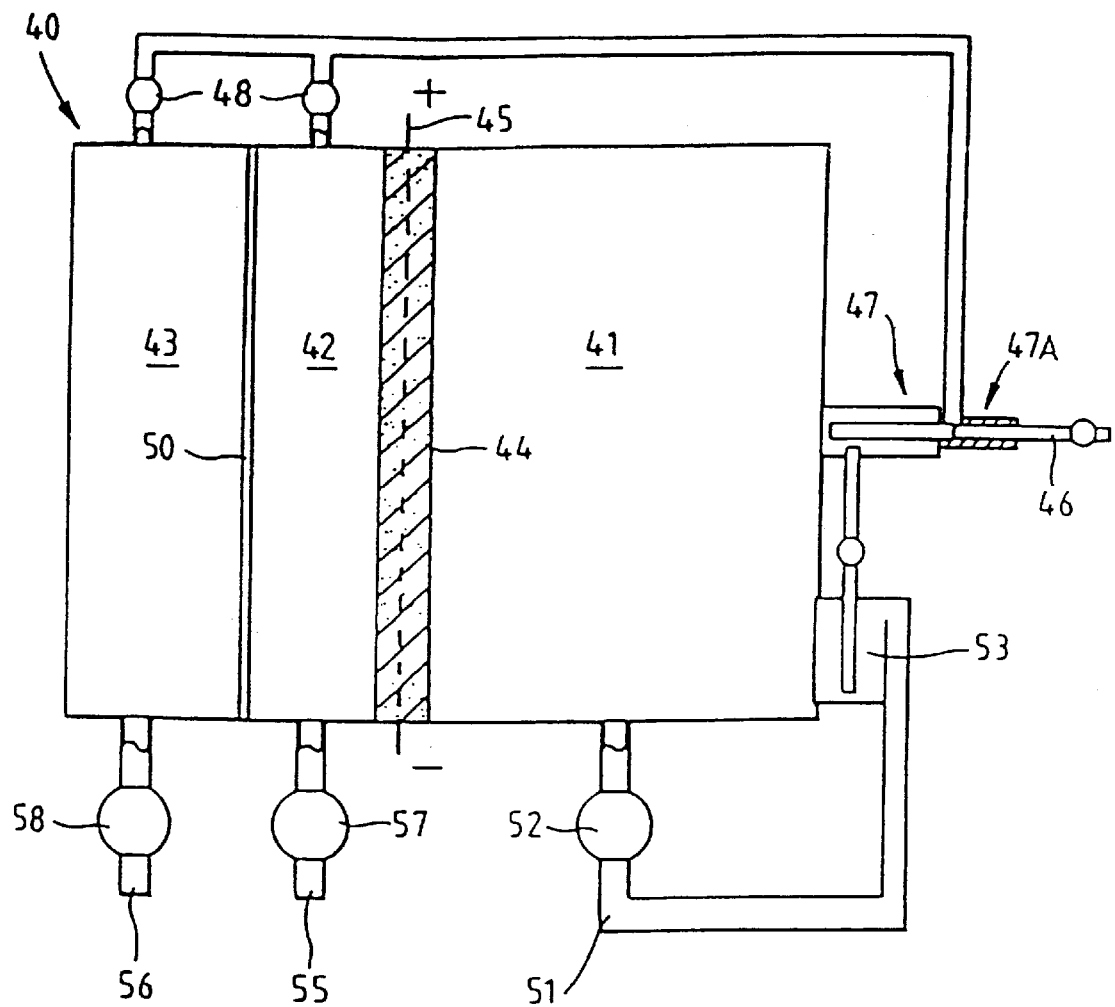
FIG. 7 is a view of a separating apparatus showing a heated porous screen.

The outlet chamber may include a further membrane to separate the chamber to a first outlet chamber and a second outlet chamber. The further membrane may be as described above. The first outlet chamber may be defined between the further membrane and the said membrane, and it is preferred that this chamber does not include any cooling means. FIG. 7 illustrates an embodiment of an apparatus according to this invention.

Referring to FIG. 7 there is shown an apparatus for separating a liquid/solid mixture which is not temperature sensitive. The apparatus comprises a body 40 separated into an inlet chamber 41 and two outlet chambers being a first outlet chamber 42 and a second outlet chamber 43. Inlet chamber 41 and first outlet chamber 42 are separated by a membrane 44 which is in the form of a rigid porous, sintered glass plate within which is encapsulated a heating element 45 capable of reaching operating temperatures of up to 400°.

A salt water mixture can pass through inlet 46 and into an atomiser 47A to emerge as a spray against membrane 44. The feed water can be at mains pressure or substantially at mains pressure. The minimum feed flow is such that it is capable of operating a water vacuum pump 47 to at least 25 mb. The vacuum side of vacuum pump 47 is connected via valves 48 to chambers 42 and 43 A reduced pressure differential is therefore constantly maintained between inlet and outlet chambers 41, 42 and 43.

The atomizer 47 delivers water droplets at an optimum size and rate to heated membrane 44. The heat transfer properties of the membrane are such that droplet contact results in almost immediate vaporisation. The resulting water vapour is drawn through the porous plate membrane and into chamber 42. Chamber 42 and chamber 43 are separated by a further membrane 50. This arrangement results in inlet chamber 41 having the water spray, while chamber 42 contains water vapour. The vapour in chamber 42 can then pass through into chamber 43 through a pervaporation process. This arrangement is particularly suitable if the water vapour needs to be further purified from other liquid contaminants, and the system can be used for other liquid mixtures.

Any liquid condensing within chamber 41 is collected through recycle pipe 51 controlled by valve 52 and passes back into atomiser 47. A feed return constant level/flow device 52 is provided between chamber 41 and atomiser 47. Any liquid within chambers 42 and 43 can be collected through outlets 55 and 56 which are controlled by valves 57 and 58. In FIG. 4, a cooling means (not shown) is positioned in chamber 43 to condense and collect the hot or warm vapours passing through membrane 50. The cooling means may comprise water which may pass through chamber 43 before passing into inlet chamber 41 such that the water can be partially warmed.

In situations where vacuum generation may not be appropriate or available, it may be possible to achieve atomisation, double chamber differential pressure using centrifugal force. This can be achieved by rotating the cylindrical membrane and heated mesh as one unit within the confines of the collection chamber casing.

Because of the good throughput of the membrane, the system can be used to provide a constant supply of vapour from the discharge side of the membrane, optionally at a desired temperature. The size of the vapour droplets can be manipulated by the membrane and the throughput is high enough to allow the system to be used to optimise fuel delivery in combustion systems.

Various parameters of the membrane (eg. deflection, temperature, permeation) can be measured by a membrane monitoring means. The means can be a patch which can be attached to or incorporated into the membrane. The patch is typically 2.5 cm by 2.5 cm, and can include an optically clear flexible resin material (Dow Silicone 184 potting resin) containing fibre optic cables (flexible, semi-rigid or rigid) and a photo-optic transducer receiver.

This patch can be incorporated in the modified pervaporation membranes as a sensor, to monitor flexing, and in some cases permeation.

The resin is optically clear which allows light, transmitted through the embedded fibre-optic cables, to be aligned and collected by other corresponding fibre-optic cables [also embedded] which are in turn connected to photo collectors or such photo collectors can be encapsulated within the resin and aligned directly to said light transmitting fibre-optic cables [also embedded]. Light transmitted by the individual fibre-optic cables are aligned so that, at rest, the light transmitted by each will be focused exactly onto a corresponding receiving optic or photo sensor.

Any light transmitted by said fibres will need to pass through the clear resin region to reach its receiving counterpart. If there is the slightest distortion, flexing, or translucency in the clear said separating region, alignment and/or transmission between the transmitting and receiving elements will change. Flexible cables relay these changes to a computer where they can be compared to pre-set parameters, and empirical measurements may then be determined.

These measurements are used to control optimum pressure and membrane movements within the modified pervaporation chamber device.

This monitoring means can be used in the following applications:

Temperature measurement when temperature sensitive materials are added into the separating zone of the resin.

Ultra-sensitive pressure measurement.

Micro vibration measurement.

Radiation transmission measurement, using reversible photosensitive materials doped into the separating zone of the resin.

Feed back device for movement monitoring and control [robotics].

It should be appreciated that various other changes or modifications may be made to the embodiment described without departing from the spirit and scope of the invention.

I claim:

1. A method for separating a liquid from a liquid-liquid mixture comprising contacting the liquid mixture against one side of a separating membrane and heating the membrane at specific intervals, such that said liquid may pass through said membrane so as to be separated from said mixture.

2. The method of claim 1, wherein the liquid mixture is contacted against the membrane as a spray.

3. The method of claim 2, wherein the membrane is flexible.

4. The method of claim 3, wherein the membrane is an elastomeric polymer membrane.

5. The method of claim 3, wherein the membrane is heated at specific intervals by a heating means spaced from the membrane, the membrane being able to contact the heating means at specific intervals.

6. The method of claim 5, wherein the membrane can flex at specific intervals to contact the heating means.

7. The method of claim 6, wherein the membrane is caused to flex by applying pressure to one side of the membrane.

8. The method of claim 7, wherein the liquid mixture contacting the membrane and the membrane are electrically charged.

9. The method of claim 7, wherein the membrane is configured to reduce backflow across the membrane, the membrane having a profiles on the feed side which allows movement across the membrane when the membrane is flat or slightly flexed, but when the membrane is flexed to a greater extent the profiles reduce backflow across the membrane.

10. The method of claim 9, wherein the profiles reduce backflow when the membrane is sufficiently flexed to contact the heating means.

11. An apparatus for at least partially separating a liquid from a liquid-liquid mixture, the apparatus having a first inlet chamber, a second outlet chamber, a membrane separating the inlet and outlet chambers and able to be contacted by the liquid mixture such that said liquid may pass through said membrane so as to be separated from said mixture, and means to heat the membrane at specific intervals.

12. The apparatus of claim 11 including a nozzle to atomise the liquid mixture as it passes into the inlet chamber.

13. The apparatus of claim 12, wherein a heating means is spaced from the discharge side of the membrane.

14. The apparatus of claim 13, wherein the membrane is a flexible polymer membrane which can flex under pressure to contact the heating means at specific intervals.

* * * * *